April 2, 1935.  W. OWEN  1,996,386
GLASS CUTTING APPARATUS
Filed Aug. 26, 1933   3 Sheets-Sheet 2

INVENTOR
William Owen
by
Bradley & Bee
attys.

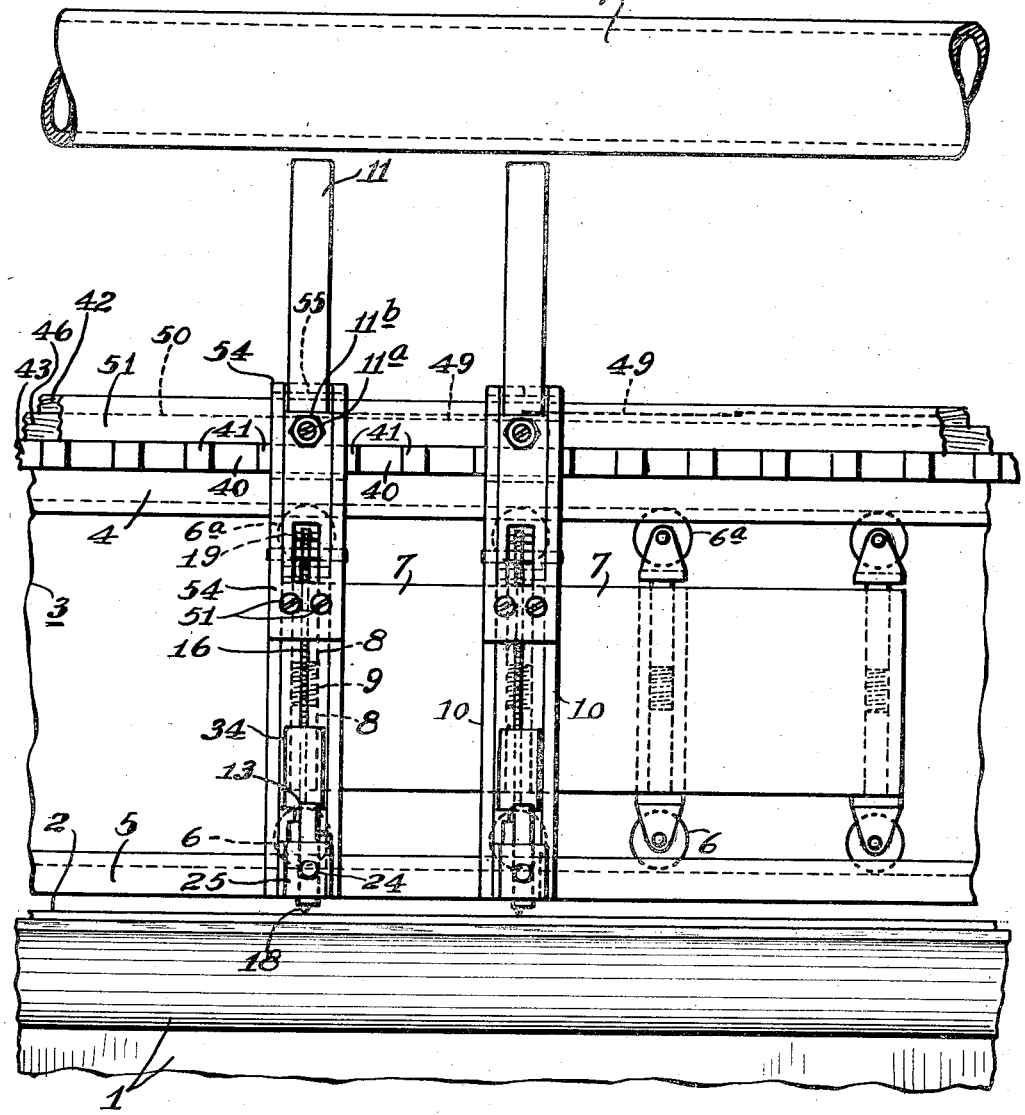

Patented Apr. 2, 1935

1,996,386

UNITED STATES PATENT OFFICE 1,996,386

GLASS CUTTING APPARATUS

William Owen, Pittsburgh, Pa., assignor to Pittsburgh Plate Glass Company, a corporation of Pennsylvania Application August 26, 1933, Serial No. 686,961

10 Claims. (Cl. 33—32)

Figure 1:
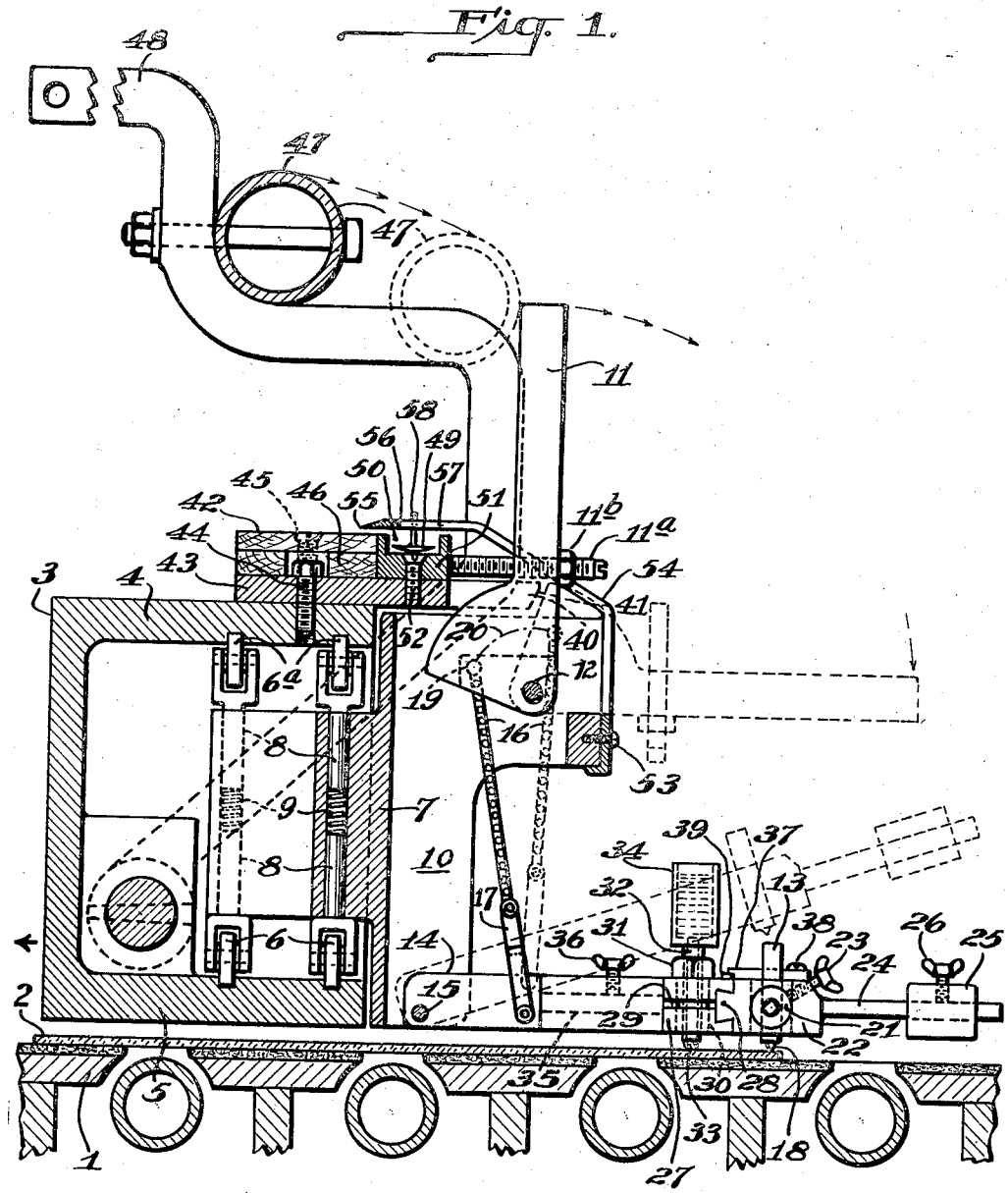
Figure 2:
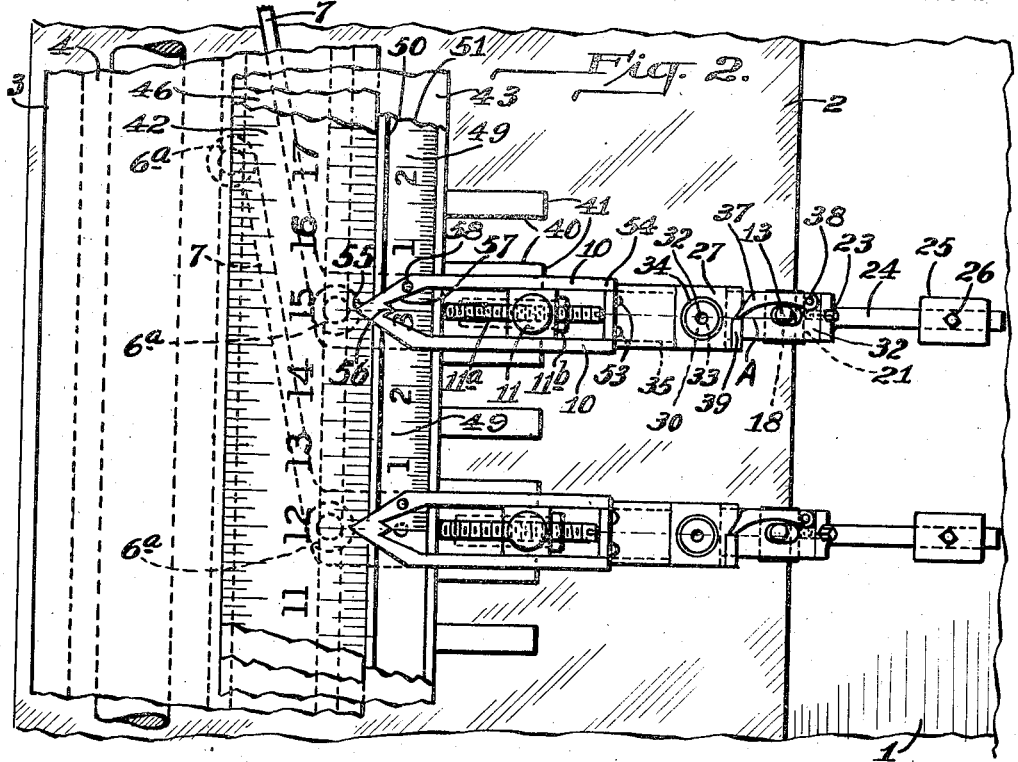
Figure 4:
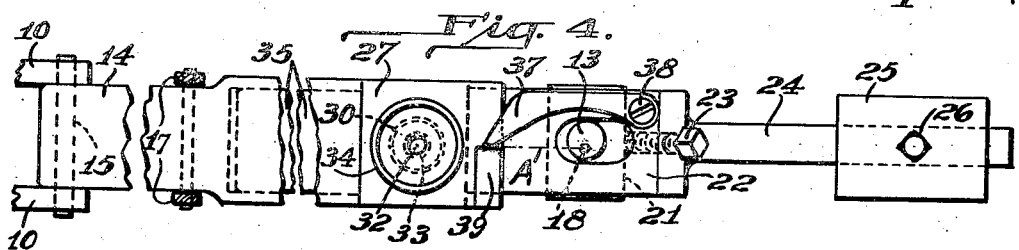
Figure 5:
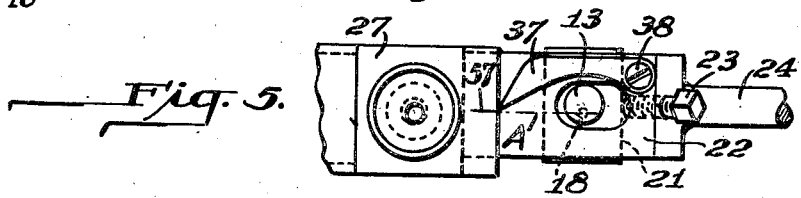
Figure 6:
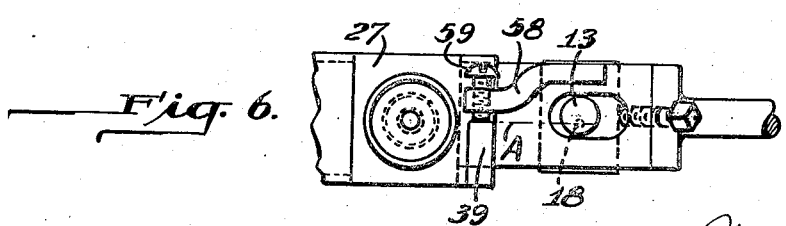

The invention relates to an apparatus for cutting glass plates or sheets into sections. The apparatus is designed particularly for cutting sheet or window glass, but may be used for cutting plate glass, and constitutes an improvement on the apparatus of my pending application Serial No. 644,926, filed April 7, 1933. The invention has to do with the cutter heads and the means for positioning them upon the bridge which moves over the glass, as in such application, and has for its principal objects; (1) the provision of improved means for raising and lowering the cutters and indexing the cutter heads on the bridge, whereby the cutting heads are indexed before the cutters engage the glass and the cutters are given a slow movement of approach to the glass, which condition is desirable in order to prevent injury to the cutters, particularly when diamonds are employed; (2) the provision of improved means permitting the accurate replacement of the cutter carriers without loss of time, and (3) the provision of an improved rule or scale system for positioning or setting the various cutter heads on the bridge, whereby the various cutters may be set by individual scales without any necessity of calculation on the part of the operator, thus reducing any error in setting the cutters and saving time. Certain embodiments of the invention are illustrated in the accompanying drawings, wherein:

Figure 1 is a vertical section through the apparatus. Fig. 2 is a partial plan view. Fig. 3 is a front elevation. Fig. 4 is a detail plan view. And Figs. 5 and 6 are detail plan views showing modifications.

Referring to the drawings, 1 is a cutting table which supports the glass sheets 2 which are to be cut into sections, and 3 is a bridge extending across the table and suitably mounted for movement over the glass in the direction indicated by the arrow in Fig. 1. This bridge carries a plurality of cutters which are individually adjustable longitudinally of the bridge so that the glass sheet may be cut into any desired number of sections of any desired dimension as later described. The bridge is preferably in the form of a channel having the flanges 4 and 5 grooved on their inner faces to provide guideways for the sets of wheels 6ª, 6ª and 6, 6, with which each of the cutter heads is provided, each cutter head having its own cutting tool. The cutter heads each comprise a body portion 7 extending at an angle to the bridge (Fig. 2) as in my application heretofore referred to and carrying the spindles 8, 8, 8, 8 in whose ends the guide rollers 6ª, 6ª and 6, 6 are mounted for rotation, such spindles being pressed yieldingly outward by means of the springs 9, 9. The front side of the head is provided with a pair of forwardly projecting flanges 10, 10 between which the operating lever 11 is mounted on the pivot 12, such lever serving the two functions, as later described, of indexing the head with respect to the bridge and of raising and lowering the cutting tool.

A cutter stem 13 is carried by a swinging arm 14 pivoted at 15 between the flanges 10, 10, such arm being connected to the lever 11 by means of the chain 16 and link 17. When the operating lever is in the vertical position indicated in Fig. 1, the arm 14 occupies the position shown with the cutter 18 carried by the stem 13 in engagement with the glass sheet. When the lever 11 is swung to the right, the pin 19, to which the upper end of the chain 16 is attached, follows the arc 20 so that when the lever arrives at a horizontal position, as shown in dotted lines, the arm 14 is raised and the cutter is out of engagement with the glass.

The cutter stem 13 extends slidably through a cylindrical member 21 mounted for rotary adjustment in the block 22. The member 21 is clamped in position by means of the thumb screw 23, so that by this means, the angle of the cutter with respect to the glass may be adjusted to suit requirements. The block 22 is provided with a forwardly projecting stem 24, on which is slidably mounted the weight 25 secured by the thumb screw 26, thus providing a means for adjusting the pressure of the cutting tool upon the glass. The block 22 has a dove-tail engagement with the second block 27, as indicated at 28, which permits of a lateral adjustment of the block 22 with respect to the block 27 for the purpose later described. In order to lock the block 22 in adjusted relation with respect to the block 27, such block 27 is split, as indicated at 29, so that when clamping pressure is applied to the two parts, the dove-tail guide portions are tightened. This clamping action is accomplished by means of a hollow bolt 30, threaded into the lower half of the block 27 and having the head 31. The bolt is made hollow in order to provide a passage for the tube 32 carrying the lubricating wick 33. This tube is connected at its upper end to the receptacle 34 which is supplied with kerosene. The block 27 is secured to the arm 14 by means of a rectangular stem 35 fitting in a suitable recess in the arm and clamped in position by means of the thumb screw 36.

The block 22 is provided upon its upper face with an indexing arm 37, as shown in Fig. 4, such arm being pivoted upon the screw 38, which can be tightened to hold the indexing arm in any desired position of adjustment. The end of this indexing arm is adapted to engage an indexing stop 39 secured to the top of the block 27 adjacent the forward end thereof. This device comes into play when a replacement of the cutter 18 is necessary. This cutter must coincide with the center line of the cutter head so that when the head is indexed at a particular dimension, the diamond will give a cut at the proper point. Due to the fact that the diamonds are in most cases off center with respect to the center lines of their stems, it is necessary to get an exact adjustment of the cutting point of the diamond by a cut-and-try method, and if this method were employed upon the cutter head, a considerable amount of time would be lost. The use of the indexing arm 37 in conjunction with a stop 39, permits this adjustment to be made away from the head on a so-called setting jig so that when it is necessary to replace the diamond on one of the heads 22, this head 22 can be removed and replaced by another head carrying a new diamond in which the relation of the diamond to the center line of the head has been ascertained and the indexing arm set accordingly. In the use of the setting jig, a member similar to the block 27 is employed, and by trial, the block corresponding to the block 22 is adjusted laterally in the block 27 until the line of cut of the diamond coincides exactly with the center line A (Fig. 4) of the block 27. The arm is then moved so that its point engages the stop corresponding to the stop 39 and the arm is clamped in position by the screw 38. If now it is necessary to replace one of the blocks 22 and the cutter carried thereby, the block as above prepared, is substituted on the machine and is adjusted laterally until the end of the arm 37 engages the stop 39, which insures that the diamond will be positioned exactly in accordance with the center line of the cutter head.

The indexing of the cutting heads longitudinally of the bridge 4 is accomplished by means of the levers 11, one of which is carried by each of the heads, and which, when in vertical position, are adapted to engage the notches 40, 40, 40, etc., lying between the ribs 41, 41, 41, etc., shown in Fig. 2. The center lines of these notches are one inch apart and each corresponds in position to the even inches of the fixed scale 42 carried by the bridge. The ribs 41 are integral with the plate 43 (Fig. 1) secured to the bridge by the stud bolts 44. The scale is secured in position by means of the screws 45 and intermediate the plates 42 and 43 is a spacing strip 46 preferably of wood. In indexing a head, the lever 11 is swung from horizontal to vertical position and engages one of the notches 40 and positions the head before the movement of the pin 19 permits the cutter 18 to engage the glass. There is thus no lateral movement of the cutter upon the glass after such cutter engages the glass. As heretofore explained, the final movement of the cutter downward is relatively slow, due to the arc 20 so that there is no injury to the cutter when it strikes the glass. The lever 11 is stopped when it reaches vertical position by the engagement of the stop screw 11ª with the block 51, such screw being held in adjusted position by the nut 11ᵇ. After a cutting operation, the levers 11 may all be moved to horizontal position by means of the indexing bar 47 extending longitudinally of the bridge and mounted for a swinging movement on the arms 48, this device being more fully set forth in my application heretofore referred to.

In addition to the fixed scale 42, an individual scale is provided for each of the cutter heads, two of such scales 49 being shown in Fig. 2. These scales lie in overlapping position in a recess 50 in the bar 51, such bar being clamped by the screws 52 to the plate 43. Secured to each head by the screws 53 is a pointer 54, such pointer having a pair of prongs 55 and 56, the prong 55 lying over and adapted to register with the graduations on the scale 42, while the prong 56 lies in opposition to and registers with the graduations on the scales 49. A triangular opening 57 is cut through the end of the pointer so that the graduations on the scales 49 can be seen from above. The scale 49 is secured to the pointer 54 by means of a pin 58 so that when the head and pointer are moved laterally, the scale 49 moves with it. Each of the heads is provided with a scale 49 which is secured to the pointer on such head, and these scales are nested one above the other. The scales are preferably of a concave-convex shape, as indicated in Fig. 1, as they are stiffer than flat scales, but it is possible to use flat scales lying one above the other. The bridge as shown in Fig. 2 illustrates only two cutter heads, but it will be understood that in practice, a considerable number of these heads are employed, so that the glass sheet 2 may be divided into as many strips as may be desired, all at the one cutting operation.

Ordinarily, one head is positioned near each of the edges of the sheet in order to trim off such edges, and the body of the sheet is divided into several sections depending upon the size of sheet desired and upon the marking of the sheet for defects. The scale 42 is ordinarily employed to set the end cutter which trims the edge of the sheet. If this cutter were placed at the twelve inch mark, as indicated, the other cutters might easily be set with reference to this cutter by calculation on the part of the operator, and if he wished to secure a strip twenty-four inches in width, he would set the next cutter at the thirty-six inch mark on the fixed scale. The entire cutting operation might thus be carried out by the use of the single scale 42, but preferably the scales 49 are used in addition to the scale 42 in order to avoid the necessity of any calculation on the part of the operator, which takes time and may involve some error. The use of the scales 49, one of which is attached to each cutter head, permits the width of each strip to be shown in inches beginning with zero. For instance, with the end cutter set at the 12 graduation, as indicated in Fig. 2, and it is desired to cut a strip three inches in width, the second head is moved over to the position shown in Fig. 2, carrying with it its scale 49, which movement uncovers the scale 49 which is attached to the end head. The prong 56 thus comes opposite the 3 graduation on the scale 49 beneath. This applies to the cutting of all the other strips as each head may be set and its prong can be read on the scale beneath in the number of inches which is to be cut from the sheet without any requirement for addition. This expedient involving the use of the nested scales 49, each of which has its zero point opposite a prong 56, renders the setting of the heads very rapid and free from error.

Fig. 5 illustrates a modification of the indexing device for the cutter, in which the stop block 39 of the Fig. 4 construction is omitted, and the point of the indexing arm 37 is positioned with respect to the block 27 by means of the line 57. In other respects, the construction is the same as that of Fig. 4.

Fig. 6 is still another modification, in which the fixed arm is substituted for the arms 37 of the Figs. 4 and 5 constructions. This arm carries a set screw 59 which is adapted to engage the stop block 39. The functioning of this apparatus is the same as that of the other forms of construction.

What I claim is:

1. In combination in glass cutting apparatus, a bridge, a cutter head adjustable along the bridge, a cutter arm mounted on the head for free up and down movement provided with a transverse guide, a block mounted for adjustment along the guide, a cutter carried on the block, indexing means on the arm adjacent the block by means of which the cutter may be centered with respect to the arm and the head, and a transversely adjustable indexing member on the block adapted to register with said indexing means.

2. In combination in glass cutting apparatus, a bridge, a cutter head adjustable along the bridge, a cutter arm mounted on the head for free up and down movement provided with a transverse guide, a block mounted for adjustment along the guide, an indexing stop member on the arm adjacent the block, a cutter carried on the block, and a transversely adjustable indexing member on the block adapted to engage the stop member and thus position the cutter at a predetermined lateral position with respect to the head.

3. In combination in glass cutting apparatus, a bridge, a cutter head adjustable along the bridge, a cutter arm mounted on the head for free up and down movement provided with a transverse guide, a block mounted for adjustment along the guide, a cutter carried on the block, indexing means on the arm adjacent the block by means of which the cutter may be centered with respect to the arm and the head, a transversely adjustable indexing member on the block adapted to register with said indexing means, and means for clamping the indexing member in adjusted position.

4. In combination in glass cutting apparatus, a bridge, a plurality of cutter heads adjustable along the bridge, indexing notches along the bridge for positioning the heads positively thereon, a vertically movable cutter arm pivoted upon each head and provided with a cutter, a lever arm pivoted on each head adapted in one position to engage one of said notches and lock the head in position and in another position to be free from said notch, and a connection between each of the arms and their respective levers arranged so that when the lever is in indexing position the cutter is lowered and engages the glass that is to be cut, and when the arm is in release position the cutter is raised out of contact with the sheet.

5. In combination in glass cutting apparatus, a bridge, a plurality of cutter heads adjustable along the bridge, indexing notches along the bridge for positioning the heads positively thereon, a vertically movable cutter arm pivoted upon each head and provided with a cutter, a lever arm pivoted on each head adapted in one position to engage one of said notches and lock the head in position and in another position to be free from said notch, and a connection between each of the arms and their respective levers arranged so that when the lever is in release position the cutter is raised and out of contact with the glass sheet to be cut, and when the lever is moved to indexing position it first engages its receiving notch and then on a further movement permits the cutter to engage the sheet.

6. In combination in glass cutting apparatus, a bridge, a plurality of cutter heads adjustable along the bridge, indexing notches along the bridge for positioning the heads positively thereon, a vertically movable cutter arm pivoted upon each head and provided with a cutter, a lever arm pivoted on each head adapted in one position to engage one of said notches and lock the head in position and in another position to be free from said notch, and a connection between each of the arms and their respective levers arranged so that when the lever is in release position the cutter is raised and out of contact with the glass sheet to be cut, and when the lever is moved to indexing position it first engages its receiving notch and then on a further movement permits the cutter to engage the sheet, said connection being arranged to give the cutter arm a relatively slow movement of approach to the glass sheet as compared with the rate of movement of the lever into its indexing notch.

7. In combination in glass cutting apparatus, a bridge, a plurality of cutter heads adjustable along the bridge, means for securing the heads in their various positions of adjustment on the bridge, a fixed scale extending along the bridge, a scale attached to each head and with such scales overlapping each other in parallel with the fixed scale, and a pointer on each head at the zero mark of the scale carried by the head and registering with the graduations on the fixed scale and the graduations on the scales carried by the other heads.

8. In combination in glass cutting apparatus, a bridge, a plurality of cutter heads adjustable along the bridge, a fixed scale extending along the bridge, indexing notches with inch spacing carried by the bridge, movable indexing members carried by the heads and adapted to engage the notches when the cutters carried by the heads are on center with respect to the inch graduations on the fixed scale, and a scale attached to each head and with such scales overlapping each other in parallel with the fixed scale, and a pointer on each head at the zero mark of the scale carried by the head and registering with the graduations on the fixed scale and the graduations on the scales carried by the other heads.

9. In combination in glass cutting apparatus, a bridge, a plurality of cutter heads adjustable along the bridge, means for securing the heads into their various positions of adjustment on the bridge, a fixed scale extending along the bridge, a scale in the form of a graduated convex concave metal strip attached to each head in parallel with the fixed scale and arranged in nested overlapping relation, and a pointer on each head at the zero mark of the scale carried by the head and registering with the graduations on the fixed scale and the graduations on the scales carried by the other heads.

10. In combination in glass cutting apparatus, a bridge, a plurality of cutter heads adjustable along the bridge, means for securing the heads into their various positions of adjustment on the bridge, a fixed scale extending along the bridge, a scale attached to each head and with such scales overlapping each other in parallel with the fixed scale, and a two prong pointer on each head at the zero point of the scale, on such head with said prongs in alinement and arranged so that one prong registers with the graduations on the movable scales attached to the other heads and the other one registers with the graduations on the fixed scale.

WILLIAM OWEN.